US008065024B2

(12) United States Patent
Nagaoka et al.

(10) Patent No.: US 8,065,024 B2
(45) Date of Patent: Nov. 22, 2011

(54) COORDINATIVE CONTROL SYSTEM FOR ADJUSTING THE BACK AND KNEE BOTTOM SECTIONS OF AN ADJUSTABLE BED

(75) Inventors: Hiroshi Nagaoka, Tokyo (JP); Masao Horitani, Tokyo (JP); Satoru Inoue, Tokyo (JP)

(73) Assignee: Paramount Bed Co., Ltd.

( * ) Notice: Subject to any disclaimer, the term of this patent is extended or adjusted under 35 U.S.C. 154(b) by 581 days.

(21) Appl. No.: 12/253,131

(22) Filed: Oct. 16, 2008

(65) Prior Publication Data

US 2009/0151074 A1 Jun. 18, 2009

Related U.S. Application Data

(63) Continuation-in-part of application No. 10/389,961, filed on Apr. 18, 2004, now abandoned.

(30) Foreign Application Priority Data

Mar. 18, 2002 (JP) ................................ 2002-075077

(51) Int. Cl.
*G05B 11/32* (2006.01)
*G05B 15/00* (2006.01)
*A61G 7/018* (2006.01)

(52) U.S. Cl. .............. 700/83; 700/69; 700/70; 700/302; 318/466; 318/467; 5/618

(58) Field of Classification Search .................... 700/62, 700/64, 67, 69, 70, 83, 302; 318/466, 467, 318/489; 5/613, 616, 617, 618, 619
See application file for complete search history.

(56) References Cited

U.S. PATENT DOCUMENTS

| | | | | |
|---|---|---|---|---|
| 5,715,548 | A * | 2/1998 | Weismiller et al. | 5/624 |
| 6,336,235 | B1 * | 1/2002 | Ruehl | 5/610 |
| 6,460,209 | B1 * | 10/2002 | Reeder et al. | 5/690 |
| 6,715,784 | B2 * | 4/2004 | Koerlin et al. | 280/650 |
| 6,854,141 | B2 * | 2/2005 | Nagaoka et al. | 5/618 |
| 6,870,341 | B2 * | 3/2005 | Nagaoka et al. | 318/475 |
| 6,976,699 | B2 * | 12/2005 | Koerlin | 280/650 |
| 7,058,999 | B2 * | 6/2006 | Horitani et al. | 5/618 |

* cited by examiner

*Primary Examiner* — Michael Safavi
(74) *Attorney, Agent, or Firm* — Townsend & Banta

(57) ABSTRACT

A bottom adjusting action control system for an adjustable bed is provided that facilitates adjustment of the adjustable bottom sections of the bed via a predetermined path of angular adjustment in reaching final set positions for the back and knee bottom sections. In particular, the control system of the present invention provides a means of adjusting the angular positions of adjustable bottom sections of the bed to predetermined final positions via preset bottom coordinative action patterns carried out by a controller means. The preset bottom coordinative action patterns raise and lower adjustable back and knee bottom sections of the bed in a coordinated manner, so as to adjust the bottom sections of the bed to the chosen angular positions without causing the user to slide relative to the bed, and without exerting uncomfortable abdominal pressure on the user.

11 Claims, 6 Drawing Sheets

COORDINATIVE CONTROL SYSTEM FOR ADJUSTING THE BACK AND KNEE BOTTOM SECTIONS OF AN ADJUSTABLE BED

This is a continuation in part application of U.S. patent application Ser. No. 10/389,961, filed Mar. 18, 2003.

FIELD OF THE INVENTION

The present invention relates, in general, to a bottom adjusting action control system for an adjustable bed, and, more particularly, to a control system which provides for presetting of a bottom coordinative action pattern. Accordingly, the control system of the present invention provides, when desiring to adjust the bottom sections of the bed of the present invention to desired positions, adjusting action can be carried out according to a preset bottom coordinative action pattern.

BACKGROUND OF THE INVENTION

At present, the position adjusting functions for an adjustable bed or the like include such functions as adjusting the inclinations of the adjustable bottom sections (such as the back bottom section and the knee bottom section), adjusting the heights of the bottom sections, adjusting the expansion and contraction, and rolling. These functions are actuated based on control commands issued from either remote control switches, or control switches mounted on a control panel which can be operated by an attendant, nurse, or the like, to bring the bottom sections to respectively desired final positions.

BACKGROUND OF THE PRIOR ART

However, the above-mentioned functions of a bed are usually carried out according to an action pattern preset when the bed or the like is manufactured. In such conventional adjustable beds, when only lifting of the back section is carried out, a forward sliding force acts on the upper half of the body, which exerts pressure on the abdominal region of the user. Further, in conventional control systems, if lifting operations of both the back and knee section are undertaken in a coordinative manner according to a predetermined action pattern, it is not possible to stop only the lifting of the knee section halfway through the process, or to move the bottom sections in such a manner as to deviate from a path to the final position. Therefore, conventional control systems for adjustment of adjustable beds fail to inhibit or reduce the exertion of undesirable abdominal pressure and/or forward sliding of the user during lifting of the back bottom section of a bed.

It is, therefore, an object of the present invention to overcome the above-mentioned deficiencies of conventional adjustable bed control systems. It is another object of the present invention to provide a bottom adjusting action control system for an adjustable bed or the like, in which when the user desires to adjust the adjustable bottom sections of an adjustable bed to a desired position, a bottom coordinative action pattern can be preset to effect adjustment of the bed according to the desired bottom coordinative action pattern. The bottom coordinative action pattern of the present invention provides a means of coordinatively adjusting the bed, resulting on lifting of the back bottom section without producing such undesirable feelings of pressure on, and forward sliding of, the user during back lifting.

SUMMARY OF THE INVENTION

To solve the above-mentioned problems, the present invention provides, a bottom adjusting action control system for an adjustable bed or the like, such as a hospital bed, stretcher, ICU bed, a long-term care bed or a bed as disclosed in U.S. Pat. Nos. 6,957,460 and 7,346,946, both of which are incorporated herein by reference. According to one aspect of the present invention, when the adjustable bottom sections of an adjustable bed are adjusted to desired positions, they can be adjusted according to a desired adjusting action pattern. That is, the bottom sections can be adjusted to suit the lying person with less burden imposed on him/her.

In a first embodiment of the present invention, wherein when the adjustable bottom sections of the bed are adjusted to desired positions, an adjusting action pattern can be preset until reaching the desired positions.

Furthermore, in a further embodiment of the present invention, a bottom adjusting action control system for a bed is provided, wherein a preset bottom coordinative action pattern is provided for lifting and lowering of the adjustable back section of the bed, such that knee lifting and lowering is carried out until the adjustable back section reaches a predetermined back lifting angle.

In another embodiment of the present invention, a bottom adjusting action control system for an adjustable bed is provided, wherein when lifting of the adjustable back bottom is carried out with adjustment of the knee bottom section of the bed, a bottom coordinative action pattern can be preset until reaching desired positions.

In a further embodiment of the present invention, a bottom adjusting action control system for an adjustable bed is provided, wherein based on the time difference between the time lifting of the adjustable knee section is begun and the time lifting of the adjustable back bottom section is begun, the time period of lifting of the knee bottom section can be preset in a bottom coordinative action pattern for back lifting of the back bottom section. In this preset action pattern, the lifting of the knee bottom section can be started first; subsequently, after lapse of a preset time difference, back lifting of the back bottom section is begun. After lapse of a preset (predetermined) knee lifting time period (of the knee bottom section), lifting of the knee bottom section is halted. Then, lowering of the knee bottom section is begun, while lifting of the back bottom section is continued until the back bottom section reaches a desired back lifting angle.

In a further embodiment of the present invention, a bottom adjusting action control system capable of adjusting the back bottom and knee bottom sections of an adjustable bed is provided, wherein a time difference between the time of lifting of the knee bottom section is begun and the time of lifting of the back bottom section is begun, as well as the final angle of the knee bottom section (i.e., the "knee lifting angle"), can be preset in a bottom coordinative action pattern. In such an embodiment, lifting of the knee bottom section is begun first; subsequently, after lapse of a preset (predetermined) time difference, lifting of the back bottom section is begun. If the knee bottom section reaches a preset knee lifting angle, knee lifting of the knee bottom section is halted, while back lifting of the back bottom section is continued until reaching a predetermined back lifting angle (i.e., a final angled resting position).

According to another aspect of the present invention, when the back bottom section of a bed is lifted and lowered, lifting and lowering can be carried out according to a preset bottom coordinative action pattern accompanying the lifting and lowering of the knee bottom section. Therefore, the lifting and lowering of the back bottom section can be adjusted with the forward sliding and abdominal pressure feeling being reduced.

According to yet another aspect of the present invention, when back lifting and knee lifting of the respective adjustable bottom sections of an adjustable bed or the like are adjusted, the adjustment is carried out according to a chosen bottom coordinative action pattern. As a consequence, lifting and lowering of the adjustable sections of the bed is carried out with less burden imposed on the body of the user.

In another embodiment of the present invention, since the time differences between the time lifting of the knee bottom section and back bottom section are begun, and the time period that lifting of the knee bottom section is carried out, can be preset, the bottom coordinative action pattern for lifting of the back bottom section can be newly set.

In yet another aspect of the present invention, the time difference between the time lifting of the knee bottom section is begun and the time lifting of the back bottom section is begun, and a knee lifting angle of the knee bottom section are preset in a bottom coordinative action pattern for adjusting the back lifting and knee lifting of the respective bottom sections.

In accordance with the above general embodiments, in a first preferred embodiment there is provided a bottom adjusting action control system for adjusting the position of bottom sections of a bed comprising a rotatable back bottom section and a rotatable knee bottom section, said control system adjusting bottom sections of the bed according to a preset action pattern, said control system comprising:

(a) a bottom adjusting controller comprising:

(i) a controller means in communication with the back bottom and knee bottom sections of the adjustable bed via drive means, said controller means operable to control adjustment (lifting and lowering) of the back and knee bottom sections, lifting of the adjustable sections when both are horizontal by activating and starting a knee lifting drive means, said knee lifting drive means being attached to a back side of the knee bottom section for lifting and/or lowering the knee bottom section, and after an amount of time has elapsed corresponding to a first preset time value stored in a computer storage means having an internal clock, the controller means then activates lifting of a back lifting drive means, which abuts a back side of the back bottom section, and continues activation of the back lifting drive means until the back bottom section is elevated to a preset angle, at which time activation of the knee lifting drive means stops, whereby to elevate the knee bottom section to an inclination angle corresponding to a second time value or inclination angle preset and stored in said computer storage means;

(ii) a user control means in communication with said controller means, said user control means facilitating adjustment and resetting of a coordinate action pattern of both the back and knee bottom sections to suit an individual user, said user control means having a first change means for adjustment of the first preset value, defined as a difference in time between start of activation of the knee lifting drive means and start of activation of the back lifting drive means, and a second change means for adjustment of the second preset value, defined as an inclination angle corresponding to a most inclined state of the knee bottom section;

said computer storage means being in communication with said user controller means, said computer storage means having a first storage area for storing the first preset value corresponding to the preset time difference changeable by the first change means, and a second storage area for storing the second preset value defined as the inclination angle corresponding to the most inclined state of the knee bottom section which is changeable by the second change means;

(b) a back lifting link in communication with said user controller means, and movably connected to said back lifting drive means for lifting the back bottom section; and (c) a knee lifting link in communication with said user controller means, and movably connected to said knee lifting drive means for lifting the knee bottom section, wherein one or more action patterns can be adjusted and reset by a user in the computer storage means, so as to provide a preset coordinative action pattern for lifting and/or lowering of the back and knee bottom sections to minimize/avoid sliding of a user in the bed when the back bottom section is lifted, and to also minimize exertion of abdominal pressure on the user by limiting inclination of the back and knee bottom sections, such that an angle between the back and knee bottom sections does not become smaller than 90° during operation of the preset coordinative action pattern.

In a second preferred embodiment of the present invention, a bottom adjusting action control system for the bed according to the first preferred embodiment above is provided, wherein back lifting drive means and knee lifting drive means comprise electric motors which incorporate rotation quantity detecting means for identifying a present inclination angle of the back and knee bottom sections, said controller means being in communication with the rotation quantity detecting means so as to monitor the inclination angle of the knee bottom section, said controller means halting activation of the knee lifting drive means when an inclination angle of the knee bottom section reaches a second value as determined by both the second preset time value and the rotation quantity detecting means in the knee lifting drive means.

In a third preferred embodiment of the present invention, a bottom adjusting action control system according to the second preferred embodiment above is provided, wherein a preset time difference between start of activation of the knee lifting drive means and start of activation of the back lifting drive means and a preset knee lifting time period of the knee bottom section can be preset in a first storage area of the computer storage means for a bottom coordinative action pattern of lifting the back bottom section, such that activation of the knee lifting drive means is started first; subsequently, after lapse of said first preset time value, activation of the back lifting drive means is started;

then, after lapse of said second preset time value stored in a second storage area of the computer storage means corresponding to a most inclined state of the knee bottom section, activation of the knee lifting drive means is stopped; thereafter, retraction of the knee lifting drive means in communication with the bottom adjusting action control system is begun so as to lower the knee bottom section, while activation of the back lifting drive means is continued until a preset desired back lifting angle of the back bottom section is reached.

In a fourth preferred embodiment of the present invention, a bottom adjusting action control system according to the second preferred embodiment above is provided, wherein the electric motors in both the back lifting drive means and knee lifting drive means provide constant back lifting speed and knee lifting speed when electric power supplied to the motors is constant.

In a fifth preferred embodiment of the present invention, a bottom adjusting action control system according to the first preferred embodiment above is provided, wherein said user control means further comprises a third change means for adjustment of lifting and lowering of the back bottom section.

In a sixth preferred embodiment of the present invention, a bottom adjusting action control system according to the first preferred embodiment above is provided, wherein said control means further comprises a fourth change means for adjustment of lifting and lowering of the knee bottom section.

In seventh preferred embodiment of the present invention, a bottom adjusting action control system according to the first preferred embodiment above is provided, wherein said control means further comprises a fifth change means for adjustment of coordinative action of back lifting and lowering and knee lifting and lowering.

In an eighth preferred embodiment of the present invention, a bottom adjusting action control system according to the first preferred embodiment above is provided, wherein said controller means affects movement of the back and knee bottom sections in accordance with an action pattern in FIG. 3.

In a ninth preferred embodiment of the present invention, a bottom adjusting action control system according to the second preferred embodiment above is provided, wherein signals detected by the rotation quantity detecting means are sent as position information to the bottom adjusting controller.

In a tenth preferred embodiment of the present invention, a bottom adjusting action control system according to the ninth preferred embodiment is provided, wherein said position information from the rotation quantity detecting means is sent to a display means. The display means may include a conventional display means, such as an LCD display, cathode ray tube, etc.

In an eleventh preferred embodiment of the present invention, a bottom adjusting action control system according to the tenth preferred embodiment above is provided, wherein the display means is an LED display.

DETAILED DESCRIPTION OF THE PREFERRED EMBODIMENTS

Figure 1:
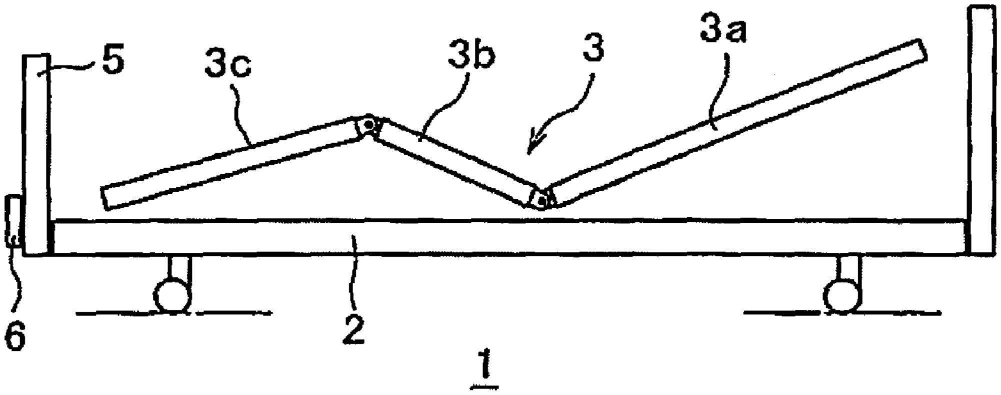
FIG. 1 is a side view of adjustable sections of an adjustable bed, illustrating an example of an adjustable bed apparatus capable of carrying out the bottom adjusting action control system of the present invention.

As shown in FIG. 1, an adjustable bed 1 is provided, having a bottom 3 placed on a bed frame 2. The bottom 3 is divided into a back bottom section **3*a* corresponding to the back, a knee bottom section 3*b* corresponding to the region from the waist to the knees, and a leg bottom section 3*c* corresponding to the legs. A back lifting link (not illustrated) operates as a back lifting mechanism and abuts against the back side of said back bottom section 3*a***.

A knee lifting link is further provided, which operates as a knee lifting and/or lowering mechanism. The knee lifting link is attached to the back side of the knee bottom section **3*b* for lifting and lowering the knee bottom section 3*b*** in a coordinated manner. The back lifting link and the knee lifting link are, respectively, connected to drive means (described later), for allowing back lifting and knee lifting.

Figure 2:
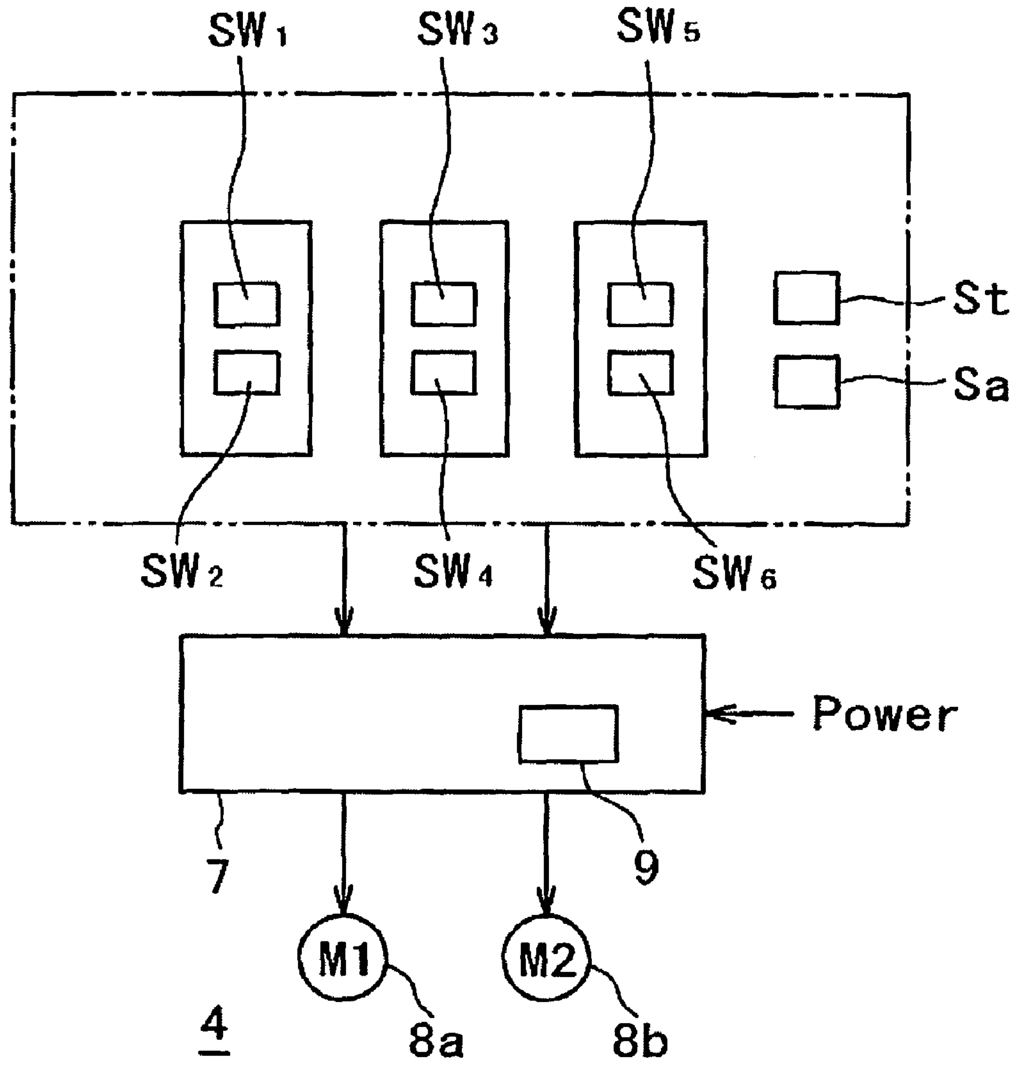
FIG. 2 is a block diagram, illustrating the bottom adjusting action control system in the bed apparatus shown in FIG. 3.

That is, the back lifting mechanism of the back bottom section **3*a* and the knee lifting mechanism of the knee bottom section 3*b* of the bed apparatus 1 are actuated by means of a bottom adjusting action control system 4, as illustrated in FIG. 2, for allowing back lifting, knee lifting and the coordinative action of back lifting and lowering and knee lifting and lowering. The bottom adjusting action control system 4** is described below.

In the bottom adjusting action control system illustrated generally at 4, the control switches (described later) are mounted on control panel 6 (FIG. 1) for issuing control commands. Control panel 6 is installed on the outer surface of a footboard 5 comprising user control means which are operated to issue action command signals to controller 7 mounted on a control box (not illustrated) placed on the bed frame 2. Controlled action power is supplied from controller 7 for starting the motors **8*a* and 8*b*** functioning as drive sources for the back lifting mechanism and the knee lifting mechanism.

On the other hand, controller 7 obtains the position information of the respective bottom sections from the action detecting means of the motors **8*a* and 8*b*. Furthermore, the controller 7 of the bottom adjusting action control system 4 has a computer storing means 9 having an internal clock operable to store a preset coordinative action pattern of the bottom 3 (see FIG. 10**).

The control panel 6 installed on the outer surface of the footboard 5 is described below. As shown in FIG. 2, the control panel 6 has control switches for back lifting and lowering (third change means), knee lifting and lowering (fourth change means), and coordinative action of back lifting and lowering, and knee lifting and lowering (fifth change means), i.e., head lifting switch Sw1, head lowering switch Sw2, leg lifting switch Sw3, leg lowering switch Sw4, back lifting and knee lifting coordinative switch Sw5, and back lowering and knee lowering coordinative switch Sw6.

Figure 3:
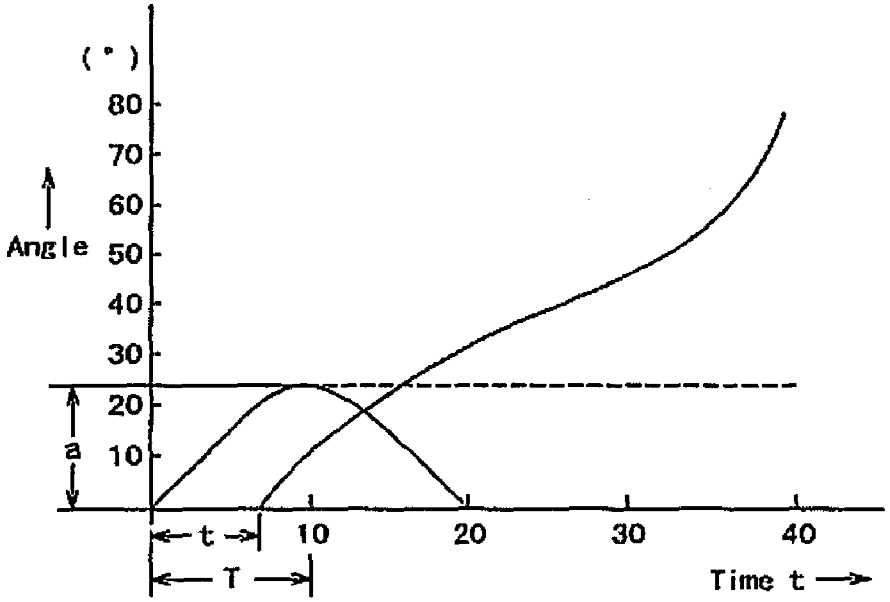
FIG. 3 is a graph illustrating an example of the bottom coordinative action pattern preset in the bottom adjusting action control system shown in FIG. 1 of the present invention, showing the change in angle of the adjustable sections of the bed over time when the adjustable sections are adjusted by the system of the present invention.

The control panel 6 (user control means) also has a time difference setting switch St (first change means), for presetting the time difference (t) between the time lifting of the knee bottom section 3*b* is begun and the time lifting of the back bottom section 3*a* is begun, and an angle setting switch Sa (second change means) for presetting the knee lifting angle a for adjusting a bottom coordinative action pattern is shown in FIG. 3.

The time difference (t) and the knee lifting angle a, respectively, preset by the time difference setting switch St and the angle setting switch Sa, are stored in the computer storing means 9 in the controller means 7 containing microprocessor 8. Based on the data stored as a newly preset action pattern, lifting and lowering of the back bottom section 3*a* and the knee bottom section 3*b* are carried out in a coordinated manner.

Furthermore, the controller 7 has the following control procedures preset in it:

(1) As switching for back lifting, knee lifting is started (the knee lifting motor is turned on for normal rotation), and after lapse of time t, back lifting is started (the back lifting motor is turned on for normal rotation). If the knee lifting angle a reaches a preset angle, knee lifting is stopped (the knee lifting motor is turned off), and knee lowering is started (the knee lifting motor is turned on for reverse rotation). The time difference t is set by means of the time difference setting switch St, and the knee lifting angle a is set by means of the angle setting switch Sa.

(2) For switching to gatch action (concurrent back lifting and knee lifting), knee lifting is begun (i.e., the knee lifting motor is turned on for normal rotation), and after a lapse of time t, back lifting is begun (i.e., the back lifting motor is turned on for normal rotation). When the knee lifting angle a reaches a preset angle, knee lifting is stopped (i.e., the knee lifting motor is turned off).

The back lifting angle of the back bottom section 3*a* is set for limiting the angle formed between the back bottom section 3*a* and the knee bottom section 3*b*, for example, at 90° or more.

Since the back lifting speed and the knee lifting speed are constant when the electric power to the motors is constant, the knee lifting angle a can also be preset as a predetermined time period T based on the relation.

Figure 10:
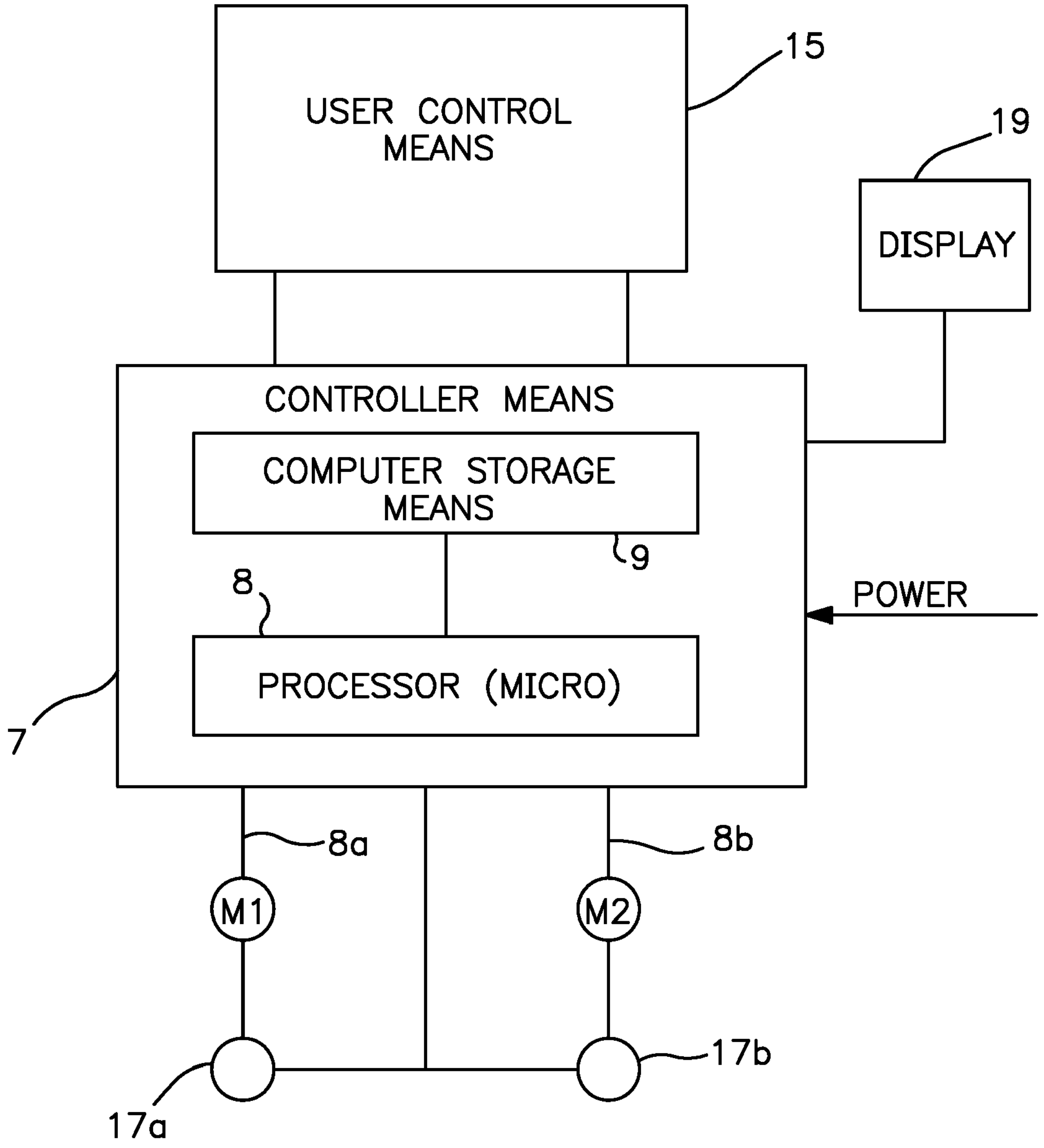
FIG. 10 is a block diagram, illustrating the controller portion of the bottom adjusting control system of the present invention.

The motors 8*a* and 8*b* have, for example, adequate rotation quantity detecting means 17*a* and 17*b*, respectively, (as shown in FIG. 10) for identifying the present state (the angular positions) of the adjustable bottom sections of the bed, i.e., the position information in reference to the rotation quantities of the motors. The detection means detect the angular positions of the adjustable sections, and then the rotation quantity detecting means 17*a* and 17*b* send signals, consisting of position information, to the controller 7 as shown in FIG. 10, and further to the control panel 6. This position information is then, as illustrated in FIG. 10, displayed, for example, on a display means 19 (LEDs, etc.), thereby informing the operator of the angular position of the adjustable bottom sections.

According to the bottom adjusting action control system 4 described above, when lifting of the back bottom section 3*a* is carried out, since a bottom coordinative action pattern accompanying the action of the knee bottom section 3*b* is used, lifting of the back section can be carried out while minimizing or avoid forward sliding of the user and exertion of uncomfortable abdominal pressure on the user. Hence, this action pattern imposes less burden and discomfort on the user.

In this case, the knee lifting angle a at which undesirable abdominal pressure is experienced by the user, is different from person to person, and the body weight of the user also differs. Since the loads acting on the motors 8*a* and 8*b* are different, the back lifting speed and the knee lifting speed also become different.

If the time difference setting switch St for presetting the time difference (t) between the time lifting of the knee bottom section is begun, and the time lifting of the back bottom section 3*a* is begun, and the angle setting switch Sa for presetting the knee lifting angle a (time T) is operated (activated) for re-presetting the time difference (t) and the knee lifting angle a, respectively, and the time differences and the knee lifting angle are stored in the storing means 9, then back lifting can be carried out effectively according to the bottom coordinative action pattern newly stored in the storing means 9.

For example, if the head lifting switch Sw1 on the control panel 6 is operated with bottom 3 lying flat (horizontally), to apply an action command for starting the back lifting, action power is at first supplied to the motor 8*b* functioning as a directly acting drive mechanism of the knee lifting mechanism, to displace the knee lifting link, for inclining the knee bottom section 3*b*. Then, after lapse of time t, the back lifting motor is turned on to supply action power to the motor 8*a* functioning as a directly acting drive mechanism of the back lifting mechanism, to displace the back lifting link, for inclining the back bottom section 3*a*. Then, if the knee lifting angle a of the knee lifting bottom section 3*b* reaches the preset angle, the knee lifting motor 8*b* is turned off, and is then turned on for reverse rotation. At this moment, the electric power for starting the reverse rotation is directed to the knee lifting motor 8*b*, to lower the knee bottom section 3*b*.

The bottom adjusting action control system 4 of the present invention also facilitates a bottom coordinative action pattern to be preset for the gatch action, with reduced forward body sliding and exertion of abdominal pressure on the user. In this embodiment, since the knee lifting angle a at which the pressure is felt is different from person to person, the angle setting switch Sa for adjusting the knee lifting angle a on the control panel 6 is preset at a desired knee lifting angle. The time difference (t) between the time instant of starting the action of the knee bottom section and the time instant of starting the action of the back bottom section is preset by means of the time difference setting switch St. The maximum back lifting angle of the back bottom section 3*a* is limited in relation with the knee lifting angle a of the knee bottom section 3*b* (for example, 90° or more).

If the back lifting knee lifting coordinative switch Sw5 on the control panel 6 is operated to apply an action command for carrying out the gatch action, at first, action power is supplied to the motor 8*b* functioning as a directly acting drive mechanism of the knee lifting mechanism, to displace the knee lifting link, for inclining the knee bottom section 3*b*. Then, after lapse of time t, the back lifting motor is turned on to supply action power to the motor 8*a* functioning as a directly acting drive mechanism of the back lifting mechanism, to displace the back lifting link, for inclining the back bottom section 3*a*.

Then, after lapse of the predetermined time period (T) when the knee lifting angle a of the knee bottom section 3*b* reaches the preset angle, the knee lifting motor is turned off, to stop the knee bottom section 3*b*, for keeping it inclined at the angle (the dotted line of FIG. 3).

The back bottom section 3*a* can be inclined until the angle between the back bottom section 3*a* and the knee bottom section 3*b* does not become smaller than 90°.

The preferred embodiments of the lifting and lowering pattern are described below in more detail, with reference to FIGS. 4-9.

Figure 4:
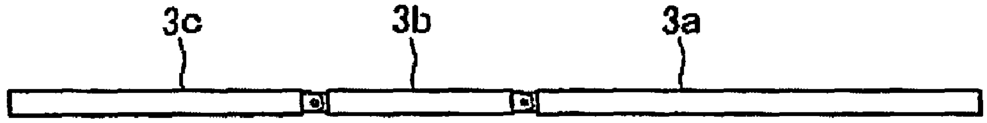
FIG. 4 is a side view of the adjustable bottom sections of an adjustable bed, as shown in FIG. 1., wherein all of the adjustable bottom sections lying flat (horizontal).
Figure 5:
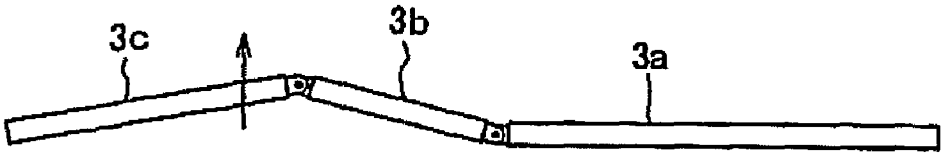
FIG. 5 is a side view of the adjustable bottom sections of an adjustable bed, as shown in FIG. 1., illustrating the angular position of the adjustable sections of the bed during one phase in the lifting process according to the method of controlling the coordinative lifting of bottom sections of the present invention, wherein only the knee bottom section has begun to be raised.

FIG. 4 shows a state where all the bottom sections 3*a*, 3*b* and 3*c* are lying flat (horizontal). In this state, a person, such as a hospital patient lies in an ordinary flat position. To allow the lying person (user) to lift his/her back portion from this flat state, control switches are operated to issue commands to that effect to the means for controlling the lifting mechanisms. In this embodiment, the control means receiving the commands first actuates the lifting mechanism of the knee bottom section 3*b*, as shown in FIG. 5, to start lifting the knee bottom section 3*b* only. The time instant when the lifting of the knee bottom section 3*b* is started is t=0, as shown in FIG. 3.

Figure 6:
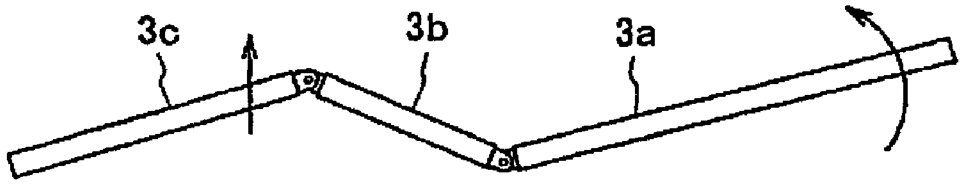
FIG. 6 is a side view of the adjustable bottom sections of an adjustable bed, as shown in FIG. 5., illustrating the angular position of the adjustable sections of the bed during one phase in the lifting process according to the method of controlling the coordinative lifting of bottom sections of the present invention, wherein the back bottom section has begun to be raised.

Subsequently, after receiving another command, the control means starts lifting the back bottom section 3*a* at the time instant (t=t). This occurs after the time when the lifting of the knee bottom section 3*b* is started, and, thereafter, as shown in FIG. 6, both the back bottom section 3*a* and the knee bottom section 3*b* are further lifted.

As described above, in this embodiment, for pivotally rotating and lifting the back bottom section 3*a* from a flat state where all the bottom sections are lying flat (horizontal), at first, the lifting of the knee bottom section 3*b* is begun. Since the knee bottom section 3*b* is lifted, the knee bottom section 3*b* supports the position of the waist of the lying person, and therefore, even if the lifting of the back bottom section is started in this state to gradually raise the back bottom section to a steeply inclined position, the lying person is preventing from sliding forward.

If the lifting of the back bottom section 3*a* and the lifting of the knee bottom section 3*b* are continued further from the state of FIG. 3 without control, the angle formed between the back bottom section 3*a* and the knee bottom section 3*b* becomes gradually smaller, thereby gradually bending the abdominal region of the lying person, and exerting uncomfortable abdominal pressure.

Figure 7:
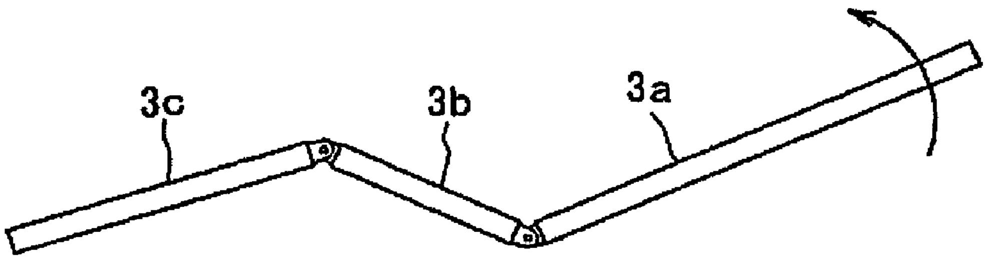
FIG. 7 is a side view of the adjustable bottom sections of an adjustable bed, as shown in FIG. 6., illustrating the angular position of the adjustable sections of the bed during one phase in the lifting process according to the method of controlling the coordinative lifting of bottom sections of the present invention, wherein raising of the back bottom section has continued, while the angular position of the knee bottom section has remained constant.

In the present invention, lifting of the knee bottom section 3*b* is not continued further without control, but if the knee bottom section 3*b* reaches a preset lifted position, lifting is halted. FIG. 7 shows this action. If the knee bottom section 3*b* reaches the preset highest position, lifting of the knee bottom section 3*b* is stopped thereafter, and lifting of the back bottom section 3*a* only is continued. In this coordinative operation, if the maximum angle of the knee bottom section 3*b* to the maximum angle of the back bottom section 3*a* is preset, the angle formed between the back bottom section 3*a* and the knee bottom section 3*b* does not become smaller than a predetermined angle.

The knee bottom section 3 that reaches the preset highest position (time instant of t=T in FIG. 3), hence the largest angle, can be controlled to maintain its position, but if it is controlled to decline from the highest position, a characteristic control action can be obtained as described below.

Figure 8:
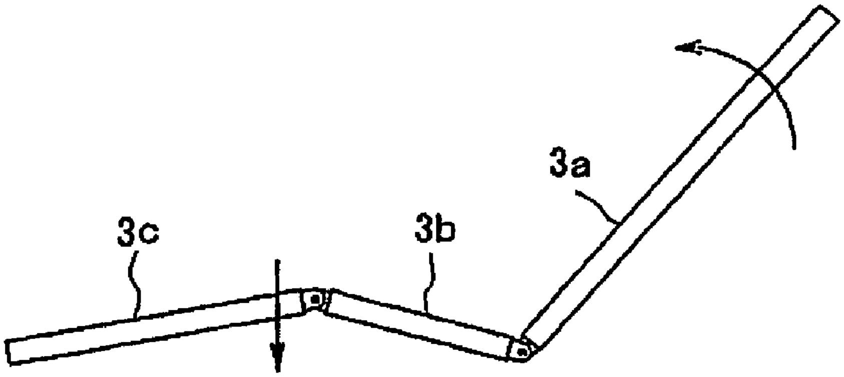
FIG. 8 is a side view, of the adjustable bottom sections of an adjustable bed, as shown in FIG. 7., illustrating the angular position of the adjustable sections of the bed during one phase in the lifting process according to the method of controlling the coordinative lifting of bottom sections of the present invention, wherein raising of the back bottom section has continued, and lowering of the knee bottom section has begun.
Figure 9:
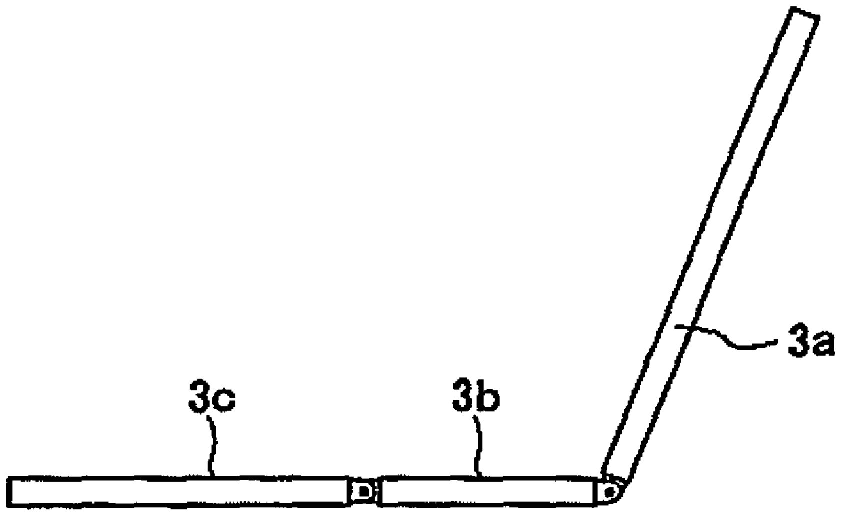
FIG. 9 is a side view of the adjustable bottom sections of an adjustable bed, as shown in FIG. 8., illustrating the angular position of the adjustable sections of the bed during one phase in the lifting process according to the method of controlling the coordinative lifting of bottom sections of the present invention, wherein knee bottom section has been lowered so as to lie flat (horizontal), and the back bottom section has been raised to a final elevated position.

The control action is that, as shown in FIG. 3, after the knee bottom section 3*b* reaches the preset highest position (time instant of t=T in FIG. 3), the control means controls to let the lifting of the back bottom section 3*b* continue, but controls to lower the knee bottom section 3*b*. This control action is illustrated in FIG. 8.

In this control action, even if the knee bottom section 3*b* is lifted further to have a larger angle at a certain time instant before the back bottom section 3*a* reaches its highest position, while the back bottom section 3*a* is further lifted to form a sharp angle, the angle of the knee bottom section 3*b* becomes gradually smaller. Therefore, the angle formed between the back bottom section 3*a* and the knee bottom section 3*b* does not become smaller than a certain predetermined angle. Therefore, in this control action, the effect of the knee bottom section 3*b* having a larger angle more positively prevents the lifting of the back bottom section 3*a* from causing the lying person to slide forward. It also prevents the lying person from experiencing excessive abdominal pressure.

The position to be reached by the knee bottom section 3*b* lowered from its preset highest position can be adequately preset, depending on various conditions. In the example shown in FIG. 9, and by the solid line of FIG. 3, the knee bottom section 3*b* is lowered to a flat position.

Next, as a first method of detecting the time when the lifting of the back bottom section 3*a* is started (t=t), later than the time when lifting of the knee bottom section 3*b* is started (t=0), and/or the time when the knee bottom section 3*b* reaches its highest position (t=T), to ensure that the control means can carry out the above-mentioned control action, the time elapsed from the time when the lifting of the knee bottom section 3*b* is started can be referred to for detecting said times.

In the case where the capacities of the drive sources such as motors for actuating the lifting mechanisms of the back bottom section 3*a* and the knee bottom section 3*b* are sufficiently larger than the forces necessary for lifting the back bottom section 3*a* and the knee bottom section 3*b* on which the load of the lying person acts, or in the case where the load is constant, there is a constant correlation between the time elapsed after the time of actuating a lifting mechanism and the position of the corresponding lifted bottom section 3*a* or 3*b*. Consequently, the elapsed time can be used to carry out the above-mentioned control actions in response to the lifted position of the bottom sections 3*a* or 3*b*.

In this case, if the preset values of said time instants t and T in the control means can be changed, an adequate control action suitable for various conditions such as the person lying on the bottom can be carried out. As a second method of detecting the time instant when the lifting of the back bottom section 3*a* is started (t=t) later than the time when the lifting of the knee bottom section 3*b* is started (t=0), and/or the time when the knee bottom section 3*b* reaches its highest position (t=T), to ensure that the control means can carry out the above-mentioned control action, a position detecting means such as an angle sensor can be installed for the knee bottom section 3*b*, to detect the angular position. The position detecting means for the knee bottom section 3*b* can be installed in conjunction with, for example, the knee bottom section lifting mechanism or the drive source such as a motor.

Also, in this case, if arrangement is made to ensure that the respective positions can be preset, an adequate control action suitable for various conditions such as the person lying on the bottom can be carried out.

The control action of the back bottom section 3*a* and the knee bottom section 3*b* to which the present invention is applied has been described as an action in the case where the back bottom section is pivotally rotated and lifted to be kept inclined from a flat state where all the bottom sections are lying flat. The action in the case where all the adjustable bottom sections are lowered to be flat from a lifted state where the back bottom section is pivotally rotated and lifted to be most inclined, is in reverse to the action explained for the case of lifting.

In another embodiment of the present invention, the action in the case where all the bottom sections are lowered to a flat position from a lifted state where the back bottom section is pivotally rotated and lifted to be most inclined, may be different from the reverse action to the action explained for the case of lifting.

Also, in the action for lowering, since the knee bottom section lifted to a certain position or the highest position is lowered thereafter, a similar action occurs when the knee bottom section is lowered. Consequently, a person lying on the adjustable bottom sections of the bed can be prevented from sliding forward, and when the entire bottom becomes flat, the person lying on the bottom is not displaced from their original position in the bed. This avoids the necessity for the caregiver to return the lying person to their original position in the bed.

INDUSTRIAL APPLICABILITY

As described above, the present invention provides the following effects:

(1) When the bottom sections of a adjustable bed or the like are adjusted to desired positions, they can be adjusted according to a desired preset adjusting action pattern. By use of the preset adjusting action pattern of the present invention, the adjustable bottom sections of the bed can be adjusted (via raising and lowering thereof) to suit the user with less discomfort to him/her.

(2) When the lifting of the back bottom section and the lifting of the knee bottom section of a bed or the like are carried out so as to adjust the angular positions of these sections, the adjustment can be carried out according to a bottom coordinative action pattern chosen by the user. Consequently, lifting and lowering of the bottom sections can be adjusted with less discomfort to the user.

(3) The time difference between the time of starting the knee lifting of the knee bottom section and the time of starting the back lifting of the back bottom section, and the knee lifting angle of the knee bottom section (knee lifting time period), can be preset, to simply and newly preset a bottom coordinative action pattern.

What is claimed is:

1. A bottom adjusting action control system for adjusting bottom sections of a bed comprising a rotatable back bottom section and a rotatable knee bottom section, said control system adjusting bottom sections of the bed according to a preset action pattern, said control system comprising:

(a) a bottom adjusting controller comprising:

(i) a controller means which is in communication with and functions when back and knee bottom sections are both horizontal to activate and start a knee lifting drive means, said knee lifting drive means being attached to a back side of the knee bottom section for lifting and/or lowering the knee bottom section, and after an amount of time has elapsed corresponding to a first preset time value stored in a computer storage means having an internal clock, the controller means then activates lifting of a back lifting drive means, which abuts a back side of the back bottom section, and continues activation of the back lifting drive means until the back bottom section is elevated to a preset angle, at which time activation of the knee lifting drive means stops, whereby to elevate the knee bottom section to an inclination angle corresponding to a second time value or inclination angle preset and stored in said computer storage means;

(ii) a user control means in communication with said controller means, said user control means facilitating adjustment and resetting of a coordinate action pattern of both the back and knee bottom sections to suit an individual user, said user control means having a first change means for adjustment of the first preset value, defined as a difference in time between start of activation of the knee lifting drive means and start of activation of the back lifting drive means, and a second change means for adjustment of the second preset value, defined as an inclination angle corresponding to a most inclined state of the knee bottom section;

said computer storage means being in communication with said user controller means, said computer storage means having a first storage area for storing the first preset value corresponding to the preset time difference changeable by the first change means, and a second storage area for storing the second preset value defined as the inclination angle corresponding to the most inclined state of the knee bottom section which is changeable by the second change means;

(b) a back lifting link in communication with said user controller means, and movably connected to said back lifting drive means for lifting the back bottom section; and (c) a knee lifting link in communication with said user controller means, and movably connected to said knee lifting drive means for lifting the knee bottom section, wherein one or more action patterns can be adjusted and reset by a user in the computer storage means, so as to provide a preset coordinative action pattern for lifting and/or lowering of the back and knee bottom sections to minimize/avoid sliding of a user in the bed when the back bottom section is lifted, and to also minimize exertion of abdominal pressure on the user by limiting inclination of the back and knee bottom sections, such that an angle between the back and knee bottom sections does not become smaller than a preset angle during operation of the preset coordinative action pattern.

2. The bottom adjusting action control system for the bed of claim 1, wherein back lifting drive means and knee lifting drive means comprise electric motors which incorporate rotation quantity detecting means for identifying a present inclination angle of the back and knee bottom sections, said controller means being in communication with the rotation quantity detecting means so as to monitor the inclination angle of the knee bottom section, said controller means halting activation of the knee lifting drive means when an inclination angle of the knee bottom section reaches a second value as determined by both the second preset time value and the rotation quantity detecting means in the knee lifting drive means.

3. The bottom adjusting action control system for the bed according to claim 2, wherein a preset time difference between start of activation of the knee lifting drive means and start of activation of the back lifting drive means and a preset knee lifting time period of the knee bottom section can be preset in a first storage area of the computer storage means for a bottom coordinative action pattern of lifting the back bottom section, such that activation of the knee lifting drive means is started first; subsequently, after lapse of said first preset time value, activation of the back lifting drive means is started; then, after lapse of said second preset time value stored in a second storage area of the computer storage means corresponding to a most inclined state of the knee bottom section, activation of the knee lifting drive means is stopped;

thereafter, retraction of the knee lifting drive means in communication with the bottom adjusting action control system is begun so as to lower the knee bottom section, while activation of the back lifting drive means is continued until a preset desired back lifting angle of the back bottom section is reached.

4. The bottom adjusting action control system for the bed of claim 2, wherein the electric motors in both the back lifting drive means and knee lifting drive means provide constant back lifting speed and knee lifting speed when electric power to the motors is constant.

5. The bottom adjusting action control system for the bed of claim 1, wherein said user control means further comprises a third change means for adjustment of lifting and lowering of the back bottom section.

6. The bottom adjusting action control system of claim 1, wherein said control means further comprises a fourth change means for adjustment of lifting and lowering of the knee bottom section.

7. The bottom adjusting action control system of claim 1, wherein said control means further comprises a fifth change means for adjustment of coordinative action of back lifting and lowering and knee lifting and lowering.

8. The bottom adjusting action control system of claim 1, wherein said controller means affects movement of the back and knee bottom sections in accordance with an action pattern in FIG. 3.

9. The bottom adjusting action control system of claim 2, wherein signals detected by the rotation quantity detecting means is sent as position information to the bottom adjusting controller.

10. The bottom adjusting action control system of claim 9, wherein said position information from the rotation quantity detecting means is sent to a display means.

11. The bottom adjusting action control system of claim 10, wherein the display means is an LED display.

* * * * *